(12) United States Patent
Meyer et al.

(10) Patent No.: US 10,167,529 B2
(45) Date of Patent: Jan. 1, 2019

(54) HARDFACING PROCESS AND PARTS PRODUCED THEREBY

(71) Applicant: Caterpillar Inc., Peoria, IL (US)

(72) Inventors: Robert L. Meyer, Metamora, IL (US); Fernando Martinez Diez, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 476 days.

(21) Appl. No.: 14/867,408

(22) Filed: Sep. 28, 2015

(65) Prior Publication Data

US 2016/0017454 A1   Jan. 21, 2016

Related U.S. Application Data

(62) Division of application No. 12/970,734, filed on Dec. 16, 2010, now Pat. No. 9,174,293.

(51) Int. Cl.
  *B32B 15/01*  (2006.01)
  *B23K 9/04*  (2006.01)
  (Continued)

(52) U.S. Cl.
  CPC .......... *C21D 9/0068* (2013.01); *B23K 9/0026* (2013.01); *B23K 9/042* (2013.01); *B23K 35/308* (2013.01); *B32B 15/01* (2013.01); *B32B 15/011* (2013.01); *B62D 55/26* (2013.01); *C21D 1/06* (2013.01); *C21D 1/18* (2013.01); *C21D 1/60* (2013.01); *C22C 38/00* (2013.01); *C22C 38/002* (2013.01); *C22C 38/02* (2013.01); *C22C 38/04* (2013.01); *C22C 38/22* (2013.01);
  (Continued)

(58) Field of Classification Search
  USPC ......................................................... 428/684
  See application file for complete search history.

(56) References Cited

U.S. PATENT DOCUMENTS 2,191,469 A   2/1940   Hopkins
2,249,629 A   7/1941   Hopkins
(Continued)

FOREIGN PATENT DOCUMENTS

DE   2142360   4/1972
DE   2701169   7/1978
(Continued)

OTHER PUBLICATIONS

Hyde, SAE & AISI Steel Identification System, <http://www.industrialbladesandknives.com/wp-content/uploads/2014/11/sae-aisi-steel-identification-system.pdf>, accessed Apr. 12, 2018. (Year: 2014).*

*Primary Examiner* — Humera N Sheikh
*Assistant Examiner* — Xiaobei Wang
(74) *Attorney, Agent, or Firm* — Finnegan, Henderson, Farabow, Garrett & Dunner, LLP

(57) ABSTRACT

A hardfacing process includes depositing a clad layer having a thickness greater than about 1 mm (0.04 in) on a surface of the component by arc welding, and creating a heat affected zone directly below the clad layer due to the depositing. The heat affected zone may be a region of the component where a lowest hardness is more than 40% lower than a base hardness of the component below the heat affected zone. The method may also include heat treating the component after the deposition such that the lowest hardness in the heat affected zone is restored to within about 15% of the base hardness of the component.

14 Claims, 5 Drawing Sheets

(51) Int. Cl.
*C21D 9/00* (2006.01)
*B62D 55/26* (2006.01)
*B23K 35/30* (2006.01)
*C21D 1/18* (2006.01)
*C21D 1/60* (2006.01)
*C22C 38/00* (2006.01)
*C22C 38/02* (2006.01)
*C22C 38/04* (2006.01)
*C22C 38/22* (2006.01)
*B23K 9/00* (2006.01)
*C21D 1/06* (2006.01)
*B23K 101/34* (2006.01)
*B23K 103/04* (2006.01)
*B23K 103/18* (2006.01)

(52) U.S. Cl.
CPC ...... *B23K 2101/34* (2018.08); *B23K 2103/04* (2018.08); *B23K 2103/05* (2018.08); *B23K 2103/18* (2018.08); *Y10T 428/12972* (2015.01)

(56) References Cited

U.S. PATENT DOCUMENTS

| | | | |
|---|---|---|---|
| 3,912,338 A | 10/1975 | Toews | |
| 4,232,096 A | 11/1980 | Franzen et al. | |
| 4,464,209 A | 8/1984 | Taira et al. | |
| 4,484,959 A | 11/1984 | Boucher et al. | |
| 4,645,720 A | 2/1987 | Pircher et al. | |
| 5,032,356 A | 7/1991 | Kumagai et al. | |
| 5,762,727 A | 6/1998 | Crawmer et al. | |
| 5,766,378 A | 6/1998 | Horn | |
| 5,914,055 A * | 6/1999 | Roberts | B23K 9/044 219/137 WM |
| 6,414,258 B1 * | 7/2002 | Amano | B23K 9/046 219/76.14 |
| 6,800,149 B2 | 10/2004 | Harth, III | |
| 2002/0098298 A1 * | 7/2002 | Bolton | C23C 24/08 427/596 |
| 2004/0234180 A1 | 11/2004 | Harada et al. | |
| 2006/0163217 A1 | 7/2006 | Jiang et al. | |
| 2006/0177689 A1 * | 8/2006 | Muir | B23K 9/044 428/684 |
| 2007/0267390 A1 * | 11/2007 | Jiang | C23C 4/12 219/121.45 |
| 2008/0176092 A1 | 7/2008 | Owens | |
| 2009/0321144 A1 | 12/2009 | Wyble et al. | |

FOREIGN PATENT DOCUMENTS

| | | |
|---|---|---|
| JP | 1974077848 | 7/1974 |
| JP | 1986037951 | 2/1986 |
| JP | 1988047337 | 2/1988 |
| JP | 1992178251 | 6/1992 |

* cited by examiner

HARDFACING PROCESS AND PARTS PRODUCED THEREBY

RELATED APPLICATION

The present application claims the benefit of U.S. application Ser. No. 12/970,734 filed Dec. 16, 2010, which is incorporated herein in its entirety by reference.

TECHNICAL FIELD

The present disclosure relates generally to a hardfacing process and parts produced by the process, and more particularly, to an arc welding hardfacing process of components subject to mechanical wear.

BACKGROUND

A metal surface that contacts and undergoes relative motion with respect to another surface experiences wear. Wear is the progressive loss of material from the metal surface as a result of friction between the interacting surfaces. Excessive wear leads to premature failure of a component. Properties such as hardness are important factors that determine the wear resistance of a metal. Hardness relates to the resistance of the metal to scratching or abrasion. The higher the hardness of the metal, the greater its resistance to wear. In some cases, after fabrication of a metal component, a heat treatment operation may be performed to increase the hardness of the component surface. As a result of the heat treatment operation, a layer of material at the component surface may have a higher hardness than the bulk of the component. The increased hardness at a surface that will experience wear improves the wear resistance and prolongs the useful life of the component. Although in general, surface hardening improves wear resistance, for components that experience very high rates of wear (such as, for example, undercarriage components of a machine, ground engaging tools, TBM wear parts, etc., that are generally referred to as wear components), increased surface hardness produced by a heat treatment operation may be insufficient for a beneficial improvement in wear resistance. Such components may be hardfaced and then heat treated to further improve its wear resistance.

Hardfacing is a low cost method of depositing wear resistant surfaces on metal components to extend service life. The American Welding Society defines hardfacing as "[a] surfacing variation in which surfacing material is deposited to reduce wear." The term surfacing is defined as "[t]he application by welding . . . of a layer, or layers, of material to a surface to obtain desired properties or dimensions, as opposed to making a joint." AWS A3.0 Standard Welding Terms and Definitions. As opposed to a hardening heat treatment operation, which involves changing the microstructure and mechanical properties of the component surface, hardfacing involves the deposition of a new material on the base material of the component. In general, the clad material may have a similar or a different composition than the base material. Hardfacing may be performed using a number of well known welding (or cladding) techniques. These known techniques can be broadly classified into three categories as, arc welding (or arc cladding), thermal spraying, and laser-based cladding. The current disclosure is specifically directed to hardfacing of a metal component using an arc welding (or arc cladding) process.

There are a number of different arc welding techniques that are commonly used in the industry to perform hardfacing. These include, for example, gas tungsten arc welding (GTAW), plasma arc welding (PAW), plasma transferred arc (PTA), gas metal arc welding (GMAW), submerged arc welding (SAW) and several others. In these processes, an arc is established to melt the surface of the base material, usually in the presence of a shield gas. The clad material, which is introduced in either wire or powder form, is also melted by the arc to form the clad layer. Arc welding produces a clad layer that is fully welded and metallurgically bonded to the substrate of the component. This clad layer may have a higher hardness, and therefore better wear properties, than the component substrate. However, a major disadvantage of arc welding is that the high temperatures involved in depositing the clad layer act to soften (or reduce the hardness of) a layer of material on the surface of the component beneath the clad layer. This zone of heat-softened material on the component surface is referred to as the heat affected zone (HAZ). Therefore, although arc welding deposits a clad layer having high wear resistance on the component surface, the wear resistance of the underlying component surface deteriorates as a result of the heat-intensive welding process. Since the clad layer will eventually wear off after extended operation, reduced wear resistance of the underlying component surface detrimentally affects the useable life of the component by hastening component wear after the clad layer has worn off. Also, in some circumstances, a relatively soft under-layer can also cause the hard clad layer to be crushed or it can crack. The damaged clad layer will then spall off the component surface. In addition, during the cladding process, the substrate will act like a heat sink and will quench the high hardenability clad layer. This clad layer will have an as-cast untempered martensite microstructure. This untempered martensite is very hard, but it is also very brittle. When these clad components are subjected to higher impact abrasive environments, the brittle clad layer often chips and spalls.

U.S. Pat. No. 2,249,629 issued to Hopkins (the '629 patent) discloses an armored article in which an armor metal is produced by fusing together a hard metal with a base metal using electric energy discharge. After the fusing operation, the armored article is subject to heat treatment to develop the desired hardness in the hard metal and the base metal. The '629 patent disclosed steel chemistry ranges for the base material and heat treatment parameters that would yield base material hardness of 200 to 400 Brinell (approximately Rkw C 18 to 43). While the process of the '629 patent includes heat treatment after a welding operation, this process may have deficiencies. For instance, the heat affected zone created by the welding process may not be restored by the process of the '629 patent.

The disclosed hardfacing process and products are directed at overcoming these and/or other shortcomings in existing technology.

SUMMARY

In one aspect, a hardfacing process for a component subject to wear is disclosed. The process includes depositing a clad layer having a thickness greater than about 1 mm (0.04 in) on a steel body of the component having a hardness between about 43 HRC and about 60 HRC using an arc welding process. The process may also include heat treating the component after the cladding. The heat treating may include austenizing the component and quenching the component in a liquid bath. The heat treatment may also include tempering the component after removing the component from the liquid bath.

In another aspect, a hardfaced component that is subject to wear is disclosed. The component may include a steel body and a clad layer which is greater than about 1 mm thick (0.04 in) metallurgically bonded to a surface of the body using an arc welding process. A lowest hardness of the body in an interfacial region that is about six times the thickness of the clad layer is within about 15% of a hardness of the body below the interfacial region.

In yet another aspect, a method of hardfacing a steel component is disclosed. The method may include depositing a clad layer having a thickness greater than about 1 mm (0.04 in) on a surface of the component by arc welding, and creating a heat affected zone directly below the clad layer due to the depositing. The heat affected zone may be a region of the component where a lowest hardness is more than 40% lower than a base hardness of the component below the heat affected zone. The method may also include heat treating the component after the deposition such that the lowest hardness in the heat affected zone is restored to within about 15% of the base hardness of the component.

DETAILED DESCRIPTION

Figure 1:
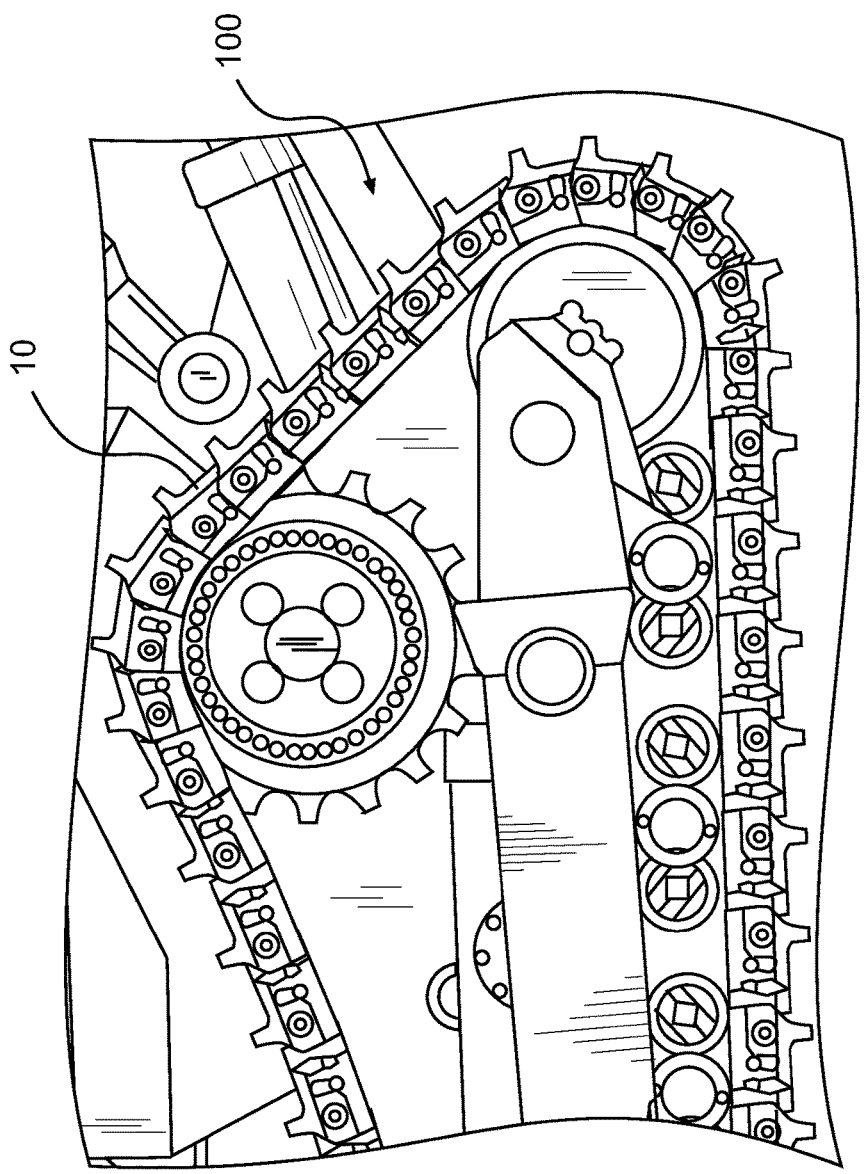
FIG. 1 is an illustration of an exemplary undercarriage of a machine.

FIG. 1 illustrates an exemplary undercarriage system 100 of a machine. The components of the undercarriage system 100 help to propel the machine over different types of rugged terrain. During operation of the machine, the components (such as, for example, track shoe 10) of the undercarriage system 100 are subject to especially severe abrasive wear due to the uncontrolled and unlubricated environments that these components operate in. After extended operation, track shoe 10 wears on surfaces where the frictional forces acting on them are the highest. With the passage of time, the track shoes 10 wear out and they have to be repaired or replaced. To extend the useful life of track shoe 10, surfaces of the track shoe 10 that are prone to wear are hardfaced.

Figure 2:
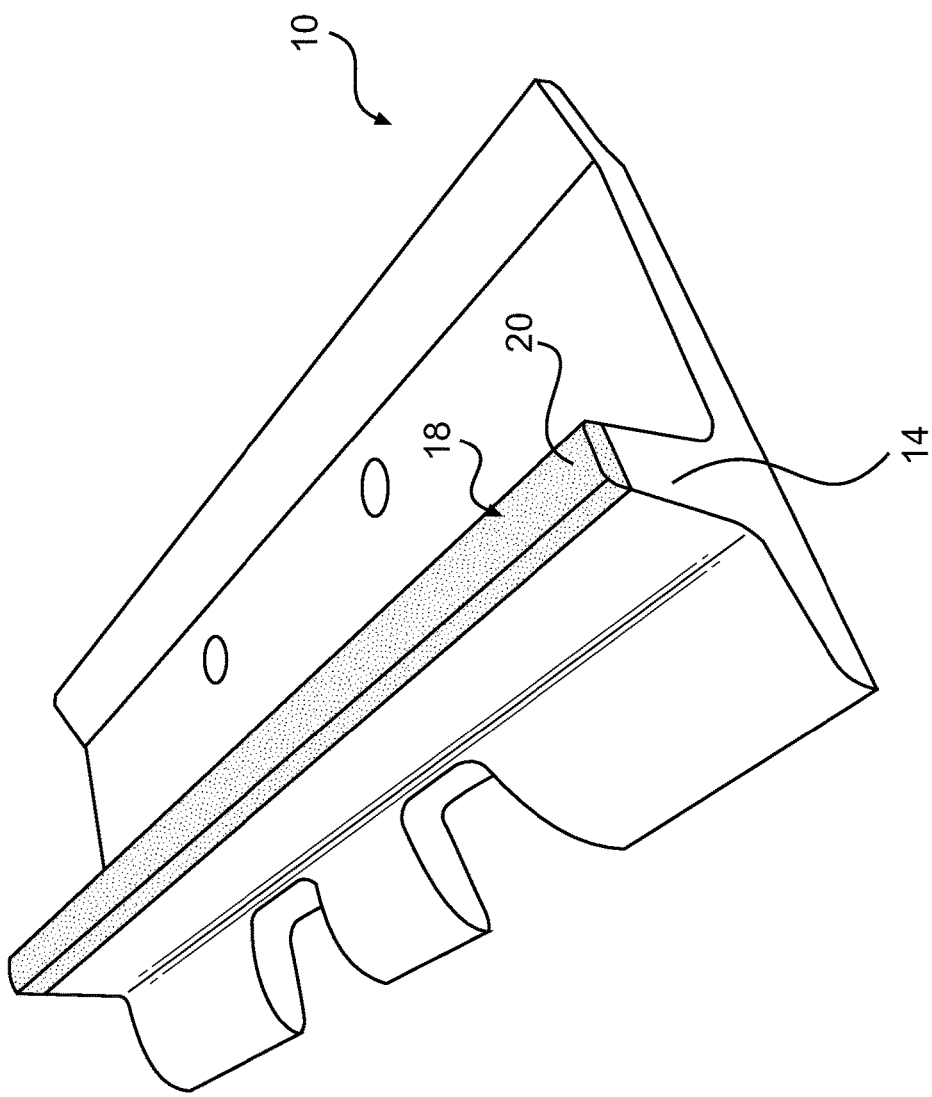
FIG. 2 is an exemplary track shoe of the undercarriage of FIG. 1.

FIG. 2 illustrates a exemplary track shoe 10 having a grouser 14. Track shoe 10 is typically fabricated from a low alloy steel, such as, for example, low alloy boron steel for enhanced hardenability. As the machine travels on a surface, a top surface 18 of the grouser 14 comes into contact with, and rubs against, the surface. Therefore, the top surface 18 experiences severe abrasive wear. For wear protection, the top surface 18 is hardfaced with a cladding 20. Although FIG. 2 illustrates the cladding 20 as being applied only on the top surface 18, this is only exemplary, and in general, any surface of track shoe 10 may be hardfaced with cladding 20. Furthermore, although cladding 20 is described as being applied to a track shoe, this is only exemplary, and in general cladding 20 may, without limitation, be applied to any component.

Top surface 18 of the grouser 14 of track shoe 10 is hardfaced with cladding 20 using a submerged arc welding process using multiple electrodes. These multiple electrodes are coupled to one or more arc welding power sources that work in conjunction to deposit the several arc welding electrodes into a single molten pool using a common potential. During the deposition process, an external flux system is used to stabilize the multiple arcs. This multiple electrode arc welding technology allows for hardfacing grouser 14 using wide clad deposits. The width of the clad deposits may vary based on the number of electrodes employed. In general, clad deposits having a width of more than 5 mm (0.20 in) and a thickness of less than 8 mm (0.31 in) are possible in a single pass using this technology based on the parameters used in the process (such as, for example, the number of electrodes employed, traveling velocity, etc.). The ability to deposit wide layers of clad material may increase the efficiency of the cladding process by decreasing the time (and associated cost) involved in the process. Although a multiple electrode submerged arc welding process was used to deposit cladding 20 on track shoe 10, it is contemplated that any type of arc cladding process may be used to hardface track shoe 10. In general, an arc cladding process deposits clad layers at a high deposition rate (which translates into high throughput) at a relatively low capital equipment cost, and therefore reduces the overall cost of the hardfacing operation. Since a layer of the base material on the top surface 18 of grouser 14 is also melted during the hardfacing operation, a metallurgical bond is formed at the interface between track shoe 10 and cladding 20.

Figure 3:
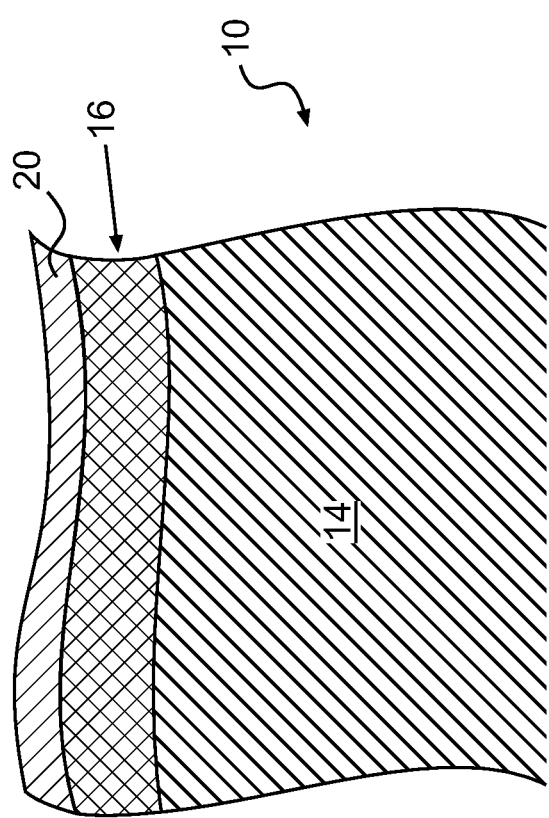
FIG. 3 is an exemplary grouser of the track shoe of FIG. 2.

FIG. 3 illustrates a schematic cross-sectional view of grouser 14 (of track shoe 10) with cladding 20 thereon. As noted above, track shoe 10 is made of a low alloy boron steel. For example, track shoe 10 may be formed of SAE 51B27 steel. However, it is contemplated that track shoe 10 may be made of any material that is typically used for such components. Cladding 20 may also include any material that is used for hardfacing track shoes and other similar components. Several materials that are suitable for such purposes are commercially available from different manufacturers. For instances, materials such as, Lincore® 33, Lincore® 55-G, Lincore® 40-O, Lincore® BU-G, etc. from The Lincoln Electric Company and Stoody® 964-G, Stoody® 996-G, Stoody® 130-O, Stoody® Vancar-O, etc. from Stoody Company may be suitable to be used as cladding 20. In FIG. 3, cladding 20 atop grouser 14 is roughly 5 mm (0.2 in) thick. In general, the thickness of cladding 20 may depend upon the application. However, in general, the thickness of cladding 20 used for hardfacing purposes may be in the order of millimeters (such as, for example between about 1 mm and 10 mm).

Due to the temperatures involved in the hardfacing operation, a heat-affected zone (HAZ) 16 exists between cladding 20 and the base material of track shoe 10. The heat-affected zone (HAZ) 16 is an area of the base material that has had its microstructure and properties altered because of the heat-intensive welding operation used to deposit cladding 20. The heat from the welding process and subsequent re-cooling causes this change in the area directly below the cladding 20. The thickness of HAZ 16, and the property change depends primarily on the chemistry of the track shoe 10 material and the amount and concentration of heat input during the welding process. In one embodiment, the HAZ 16 between cladding 20 and the base material of track shoe 10 was estimated to be between about 20 and 30 mm (0.79 in to 1.18 in). However, in general, the thickness of HAZ 16 may depend upon the materials and the process conditions. For instance, if the thermal diffusivity of the base material of the track shoe 10 is high, the cooling rate after welding will be high and the thickness of HAZ 16 will be relatively small. Similarly, a low thermal diffusivity leads to slower cooling and a thicker HAZ 16. The expected thickness of HAZ 16 during arc cladding any composition of steel may be estimated using known mathematical models or by other techniques known in the art. For some embodiments of the current disclosure, the HAZ 16 was estimated to be about 6 times the thickness of the cladding 20.

Regarding the properties of the material in HAZ 16, hardness is a property of particular importance in a wear related application. Due to the heat-intensive welding operation used to deposit cladding 20, the hardness of the material in HAZ 16 will be reduced. In general, the greater the heat input during the welding operation, the thicker will be HAZ 16. The reduction in hardness in HAZ 16 negatively affects the wear life of track shoe 10. For instance, because of the hardness reduction in the base material directly below cladding 20, the wear of the track shoe 10 will proceed at an accelerated pace after cladding 20 has worn off. Also, in some cases, the presence of a region of soft material (caused due to the reduction of the hardness in HAZ 16) directly below cladding 20 may cause portions of the overlying cladding 20 to spall off the surface of track shoe 10. In addition, during the cladding process, the substrate will act like a heat sink and will quench the high hardenability clad layer. This clad layer will have an as-cast untempered martensite microstructure. This untempered martensite is very hard, but it is also very brittle. When these clad components are subjected to higher impact abrasive environments, the brittle clad layer often chips and spalls.

To restore the hardness of track shoe 10 in HAZ 16, the track shoe 10 is subjected to a heat treatment operation after cladding (post-cladding heat treatment). This heat treatment may include austenetizing, quenching, and tempering. During the welding process, in some cases, cracks may form on the surface of cladding 20. Subjecting a hardfaced track shoe 10, with cracks in cladding 20, to a temperature excursion (such as, during heat treatment) may induces stresses in the cladding 20 that may tend to propagate these cracks into the base material. These cracks could lead to premature failure of the component. Therefore the heat treatment conditions of track shoe 10 are tailored to eliminate or decrease the propensity to propagate any cracks that may be present in cladding 20. In some embodiments, the heat treatment process is designed such that a temperature change of the track shoe 10 during quench is below a temperature change that will cause a crack in cladding 20 to propagate.

Austenizing is a heat treating operation where the actual transformation of the base material (steel) of track shoe 10 takes place. The austenizing may include heating track shoe 10 above the austenetization temperature of the base material of track shoe 10, and maintaining the temperature for a desired time. All grades of steel have an austenetization temperature. The temperature to which track shoe 10 is heated during austenizing depends upon the austenetization temperature of the steel used to fabricate track shoe 10, and the likelihood of crack propagation in cladding 20. In general, this temperature depends on the austenetization temperature of the wear component that is being hardfaced. For the SAE51B27 steel used in an embodiment of a track shoe 10 with cladding 20, austenizing may include placing the track shoe 10 in a furnace at a temperature between about 875° C. (1607° F.) and 900° C. (1652° F.) for about 60 minutes. The actual time that track shoe 10 is maintained at the austenizing temperature depends on the size and thickness of track shoe 10. In an embodiment, where the thickness of track shoe 10 is about 50 mm, the hold time (the amount of time the track shoe is maintained at austenizing temperature) is about 60 minutes. For thicker track shoes 10, this hold time may be higher. In practice, a continuous furnace is used for the austenization of track shoe 10. In this continuous process, several track shoes 10 arranged on a conveyor are passed through a furnace that includes a zone maintained at a temperature between about 875° C. (1607° F.) and 900° C. (1652° F.). The track shoes 10 pass through this zone in about 60 minutes.

After austenizing, the track shoes 10 are quenched. Quenching is the relatively rapid cooling of track shoe 10 to a temperature below the martensitic start temperature of the base material (steel) of track shoe 10. In an embodiment of track shoe 10, quenching is performed by dropping track shoe 10, which is at the austenizing temperature, into a water bath maintained at a temperature between about 35° C. (95° F.) and about 41° C. (106° F.). The track shoe 10 is removed from the water bath after about 40 to 60 seconds. When the track shoe 10 is removed from the water bath, the track shoe 10 has a residual temperature between about 100° C. (212° F.) and about 300° C. (572° F.). In some embodiments, the track shoe 10 is removed from the water bath after about 50 seconds when the residual temperature of the track shoe is between about 115° C. (239° F.) and about 150° C. (302° F.). In some embodiments, oil or a polymer maintained at a desired temperature may be used in place of the water bath. The desired temperature of the bath and amount of time the track shoe 10 is immersed in the bath depends upon the desired residual temperature of track shoe 10 after quenching. This residual temperature is chosen so as to eliminate or reduce the likelihood of any cracks that may be present in cladding 20 to propagate. A low residual temperature increases the temperature change experienced by the track shoe 10 during quenching. A larger temperature change increases the stresses that tend to propagate the crack. Similarly, a smaller value of temperature change decreases the stresses that tend to propagate a crack. Therefore, in an embodiment where the likelihood of cracks in cladding 20 is high, the quenching operation may be tailored to increase the residual temperature of the track shoe 10. In general, the quenching operation may be tailored to reduce the temperature of the track shoe 10 to a temperature below the martensitic start temperature of the steel (of track shoe 10) and above a temperature at which the stresses in cladding 20 will cause the cracks to propagate.

After quenching, martensite is formed in track shoe 10. Although martensite is the desired microstructure for increased wear resistance, the steel is brittle after quenching. Therefore, after quenching, track shoe 10 is tempered. Tempering is the process of heating the track shoe 10 to increase its toughness at the expense of hardness (and brittleness). In one embodiment, the track shoe 10 is tempered by placing the track shoe 10 in a tempering furnace maintained at a temperature between about 143.3° C. (290° F.) and about 154° C. (309° F.) for about 85 to about 90 minutes. After tempering, track shoe 10 is cooled to room temperature in air. The track shoe 10 may be allowed to cool in air naturally or may be forced to cool to room temperature at a fast rate to save time. It should be emphasized that although heat treatment process conditions for a particular type of steel is described above, in general, the process conditions employed during heat treatment depends on the type of steel that is hardfaced.

For components that are not hardfaced to improve wear, heat treatment is typically performed after the component is machined or otherwise formed. Heat treatment after forming removes the stresses induced in the component because of the processes used to form the component. For hardfaced components known in the art, heat treatment is performed before hardfacing to prevent the clad layer from cracking. In the cladding process of the current disclosure, a heat treatment process is performed after the cladding 20 is deposited. This post-cladding heat treatment process may be in lieu of, or in addition to, any heat treatment that is performed after forming track shoe 10. Subjecting track shoe 10 to a heat treatment process (that includes austenizing, quenching, and tempering) after depositing cladding 20 may restore the hardness in HAZ 16 to the hardness of the base material, which may, in general be above about 43 Rockwell C (hardness in the Rockwell C scale), or between about 43 HRC and about 60 HRC, in preferred embodiments. Obviously the clad layer also is exposed to the same heat treatment process (that includes austenizing, quenching, and tempering). Tailoring the conditions of the heat treatment process to eliminate or reduce the likelihood of crack propagation in the cladding 20 may also improve the quality and reliability of the cladding 20.

INDUSTRIAL APPLICABILITY

The hardfacing process of the current disclosure may be applicable to any application where it is desired to increase the wear resistance of hardfaced parts. These hardfaced parts produced by the process may be used in any application where increased wear resistance is desirable. In an exemplary embodiment, a hardfaced part of the current disclosure may be a track shoe of a machine that is used in a work environment.

Figure 4:
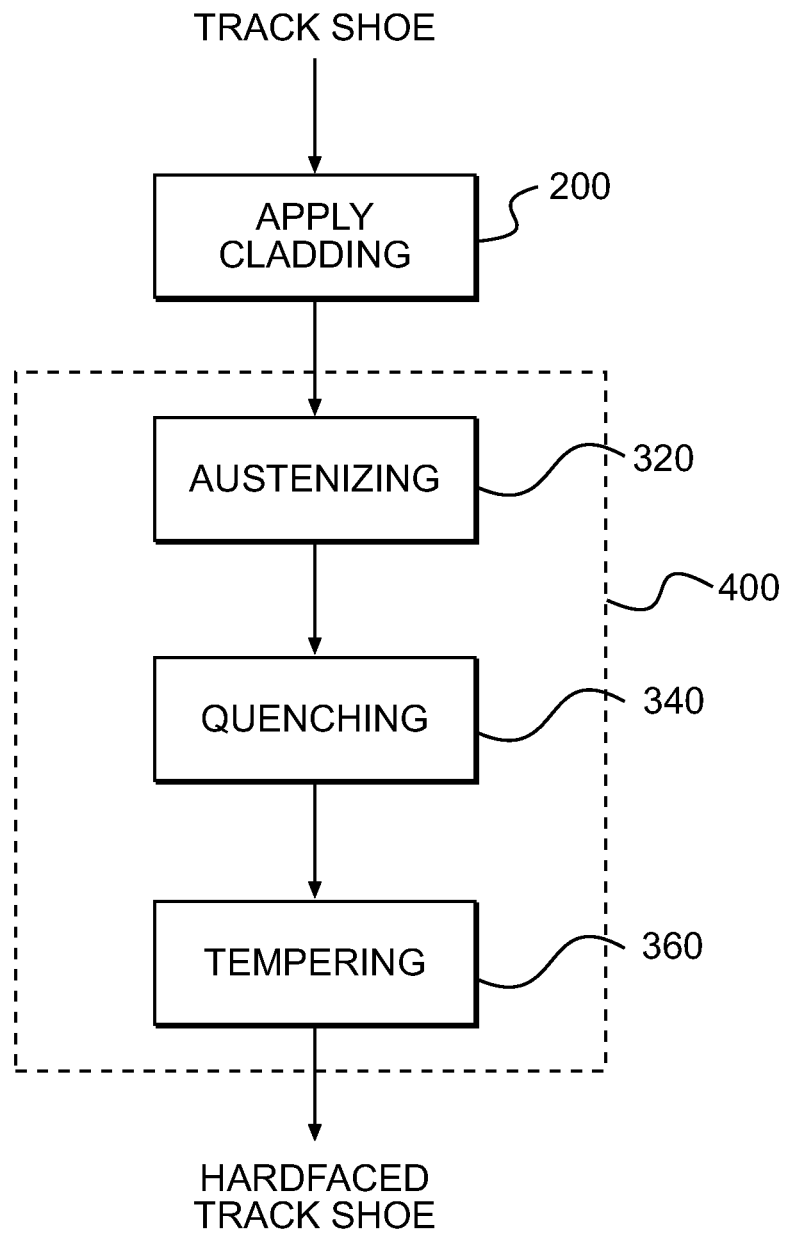
FIG. 4 is a schematic illustrating an exemplary process of the current disclosure.

The top surface 18 of the grouser 14 of a track shoe 10 (see FIG. 2) was hardfaced with a cladding 20 using a multi-electrode submerged arc welder using an embodiment of the disclosed process. FIG. 4 illustrates a schematic of the applied exemplary process. The track shoe 10 was made of SAE51B27 low alloy boron steel, and about a 5 mm (0.2 in) thick cladding 20 of Lincore® 55G was applied to the top surface 18 (step 200). To evaluate the effect of heat treatment on the HAZ 16 formed due to the hardfacing process, a track shoe 10 was subject to post-cladding heat treatment (step 400) after hardfacing. The heat treatment process included austenizing (step 320), quenching (step 340), and tempering (step 360). Austenizing the track shoe 10 was performed by placing track shoe 10 in a furnace maintained at about 884° C.±5° C. (1623° F.±41° F.) for about 60 minutes. After about 60 minutes, the track shoe 10 was dropped in a water bath maintained at about 35° C. to 40° C. (95° F. to 105° F.), and removed from the water bath after about 59 seconds. The residual temperature of the quenched track shoe 10 was between about 115° C. (239° F.) and about 150° C. (302° F.). Tempering was performed by placing the quenched track shoe 10 in a tempering furnace maintained at about 149° C. (300° F.) for about 87 minutes. After this time, the track shoe 10 was cooled to room temperature in air.

Figure 5:
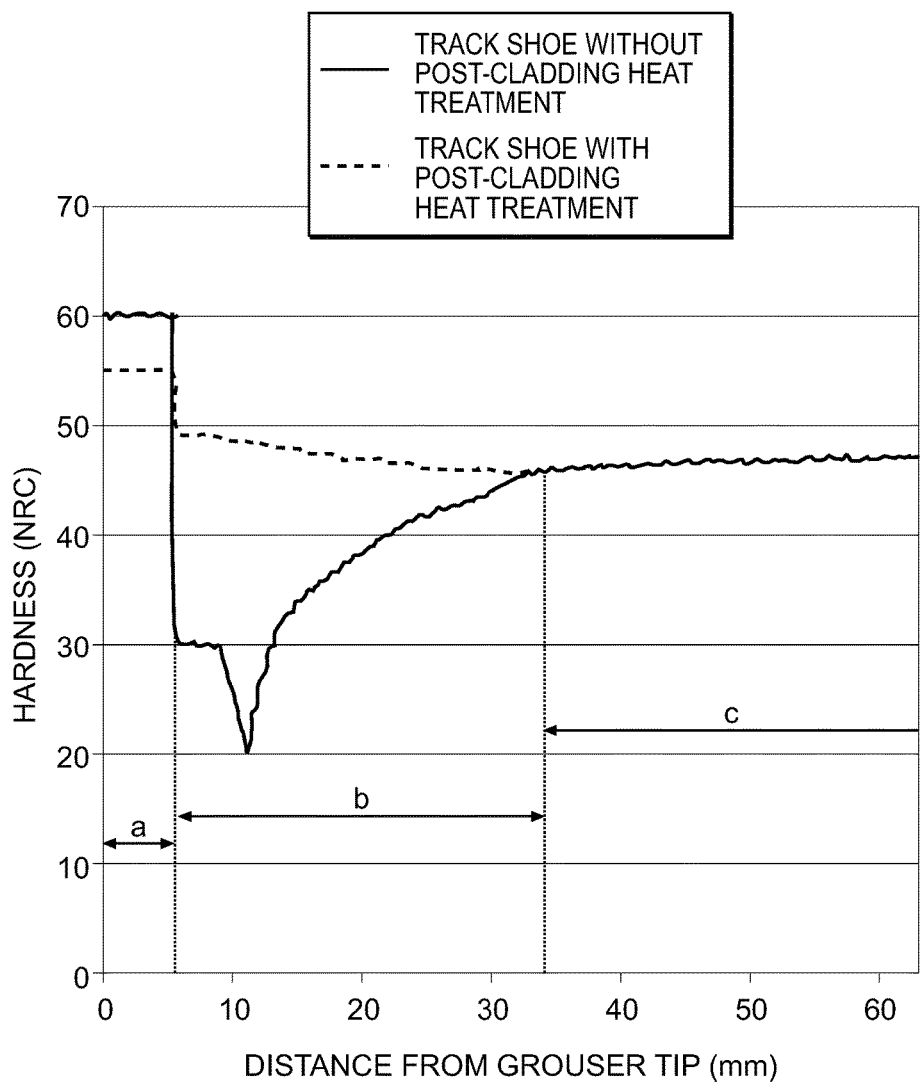
FIG. 5 is a graph plotting the hardness of a track shoe as a function of depth from the surface.

The hardness of the track shoe 10 from the surface of cladding 20 as a function of depth into the cladding 20 (and grouser 14) was then measured. To evaluate the impact of the post-cladding heat treatment on HAZ 16, hardness tests were also performed on a similarly hardfaced track shoe which was not subjected to post-cladding heat treatment (control sample). FIG. 5 is a curve comparing the observed hardness as a function of depth into the grouser 14 for the track shoes with and without post-cladding heat treatment. Since the thickness of cladding 20 on track shoe 10 is about 5 mm (0.2 in), the measured hardness for the first 5 mm (0.2 in) (region marked "a" in FIG. 5) represents the hardness of the cladding 20. As evident from FIG. 5, the hardness of the cladding 20 of the control sample is about 5 HRC higher than the cladding 20 of the track shoe 10 which was subject to post-cladding heat treatment. This observed reduction in surface hardness is due to tempering of the cladding 20 of the heat treated track shoe 10. During tempering, toughness of cladding 20 increases at the expense of hardness. The region marked "b" below the cladding 20 (from about 5 mm (0.2 in) to about 32 mm (1.26 in) from the grouser surface) is the heat-affected zone (HAZ 16). Comparison of the curves in this region shows a substantial reduction in hardness of the control sample. Analysis of the data indicates that, in the control sample, the lowest hardness in HAZ 16 was about 57% lower than that in the bulk material (marked "c" in FIG. 5). This reduction in hardness is the effect of the heat-intensive welding operation used to deposit cladding 20. The observed trend of the hardness in this region is as a result of the different temperatures that different regions of HAZ 16 (below the surface) experience as a result of the welding operation, and the differing amounts of hardness that result therefrom. In the heat treated track shoe 10, however, the subsequent post-cladding heat treatment restored the hardness in HAZ 16 to a value substantially equal to the hardness of the bulk material. At depths greater than about 32 mm (1.26 in) (marked "c" in FIG. 5), the hardness of both the samples are equal to the hardness of the bulk material (about 47 HRC). Analysis of the data indicated that, in the heat treated track shoe 10, the post-cladding heat treatment restored the hardness in HAZ 16 to within 10% of the hardness of the bulk material. As evident from FIG. 5, post-cladding heat treatment significantly improves the hardness of a hardfaced track shoe 10 in HAZ 16. Although the surface hardness of the cladding decreases slightly after post-cladding heat treatment, it is believed that the increase in hardness of the HAZ region far outweighs this slight decrease in surface hardness. Also the clad layer is much tougher after heat treatment and it will resist chipping and spalling.

To evaluate the impact of different processing parameters (such as, for example, different track shoe materials, cladding materials, cladding conditions, etc.) on the hardness in HAZ 16, multiple track shoes (that were heat treated prior to cladding) were clad using the different processing conditions. The hardness of these samples, which were not subject to post-cladding heat treatment, were measured as a function of depth into the grouser of the track shoe. It was observed that the lowest hardness measured in the HAZ of these track shoes were between about 40% and 95% below the bulk hardness of the track shoe material. To study the effect of post-cladding heat treatment, track shoes hardfaced using the same processing conditions were subjected to different post-cladding heat treatment operations (with different preheats, austenizing and tempering temperatures, hold time, quench media, etc.). The hardness of these hardfaced track shoes, that were subject to post-cladding heat treatment, were then measured as a function of depth. It was observed that, although, the absolute value of measured hardness in each case was a function of the particulars of the heat treatment operation, in all cases, post-cladding heat treatment restored the hardness in the heat-affected zone to a value substantially equal to that in the bulk material. While in some cases, the hardness in HAZ 16 was restored to within about 5% of the hardness of the bulk material, in all cases, the hardness in HAZ 16 was restored to about 15% of the hardness of the bulk material.

By heat treating a hardfaced steel component after the cladding operation, the hardness of heat affected zone, caused as a result of the heat-intensive hardfacing operation, may be restored to a value substantially equal to the hardness of the base material. In general, after the heat treatment, the hardness of the heat affected zone may be restored to within 15% of the hardness of the base material, while in some cases, the hardness may be restored to within 10%, or even 5% of the hardness of the base material. The heat treatment may also be tailored to prevent the propagation of any cracks that may be present in the cladding before the heat treatment.

It will be apparent to those skilled in the art that various modifications and variations can be made to the disclosed hardfacing process. Other embodiments will be apparent to those skilled in the art from consideration of the specification and practice of the disclosed cladding process. It is intended that the specification and examples be considered as exemplary only, with a true scope being indicated by the following claims and their equivalents.

We claim:

1. A hardfaced component that is subject to wear, comprising:
   a boron steel body that includes SAE 51B27 steel; and
   a clad layer, greater than about 1 mm thick (0.04 in), metallurgically bonded on a surface of the steel body using an arc welding process, wherein a lowest hardness of the steel body in an interfacial region that is about six times the thickness of the clad layer is within about 15% of a hardness of the body below the interfacial region.

2. The component of claim 1, wherein the hardness of the body below the interfacial region is between about 43 HRC and about 60 HRC.

3. The component of claim 1, wherein the clad layer is more than about 5 mm (0.2 in) thick.

4. The component of claim 1, wherein the interfacial region is a heat affected zone formed directly below the clad layer.

5. The component of claim 4, wherein the hardness of the steel below the heat affected zone is between about 43 HRC and about 60 HRC.

6. The component of claim 4, wherein the clad layer is more than about 5 mm (0.2 in) thick.

7. The component of claim 1, wherein the component is a track shoe having a grouser and the clad layer is on a surface of the grouser.

8. A hardfaced component that is subject to wear, comprising:
   a low alloy boron steel body forming a track shoe that includes at least one grouser and wherein the steel body includes SAE 51B27 steel; and
   a clad layer formed only on a top surface of the grouser of the track shoe, the clad layer being greater than about 1 mm thick (0.04 in), metallurgically bonded on a surface of the top surface of the grouser of the track shoe formed of the steel body using an arc welding process, wherein a lowest hardness of the steel body in an interfacial region that is about six times the thickness of the clad layer is within about 15% of a hardness of the body below the interfacial region.

9. The component of claim 8, wherein the hardness of the body below the interfacial region is between about 43 HRC and about 60 HRC.

10. The component of claim 8, wherein the clad layer is more than about 5 mm (0.2 in) thick.

11. A hardfaced component that is subject to wear, comprising:
    a steel body made of SAE 51B27 steel;
    a clad layer, greater than about 1 mm thick (0.04 in), metallurgically bonded on a surface of the steel body using an arc welding process; and
    a heat affected zone directly below the clad layer, wherein the heat affected zone has a thickness about six times the thickness of the clad layer and has a lowest hardness within about 15% of a hardness of the body below the heat affected zone.

12. The component of claim 11, wherein the hardness of the body below the heat affected zone is between about 43 HRC and about 60 HRC.

13. The component of claim 11, wherein the clad layer is more than about 5 mm (0.2 in) thick.

14. The component of claim 11, wherein the component is a track shoe having a grouser and the clad layer is on a surface of the grouser.

* * * * *